US008724276B2

(12) United States Patent
Igl et al.

(10) Patent No.: US 8,724,276 B2
(45) Date of Patent: May 13, 2014

(54) MULTI-STAGE OVERVOLTAGE PROTECTION CIRCUIT, IN PARTICULAR FOR INFORMATION-TECHNOLOGY SYSTEMS

(75) Inventors: Peter Igl, Seligenporten (DE); Thomas Boehm, Hohenfels (DE)

(73) Assignee: Dehn + Söhne GmbH + Co. KG, Neumarkt/Opf. (DE)

( * ) Notice: Subject to any disclaimer, the term of this patent is extended or adjusted under 35 U.S.C. 154(b) by 117 days.

(21) Appl. No.: 12/998,457

(22) PCT Filed: Oct. 20, 2009

(86) PCT No.: PCT/EP2009/063742
§ 371 (c)(1),
(2), (4) Date: Jul. 5, 2011

(87) PCT Pub. No.: WO2010/046365
PCT Pub. Date: Apr. 29, 2010

(65) Prior Publication Data
US 2013/0215544 A1    Aug. 22, 2013

(30) Foreign Application Priority Data

Oct. 21, 2008  (DE) .......................... 10 2008 052 488
May 27, 2009  (DE) .......................... 10 2009 022 832

(51) Int. Cl.
*H02H 3/22*    (2006.01)
(52) U.S. Cl.
USPC .......................................... 361/91.1; 361/111
(58) Field of Classification Search
USPC .................................... 361/56, 91.1, 111, 117
See application file for complete search history.

(56) References Cited

U.S. PATENT DOCUMENTS 5,105,324 A * 4/1992 Murari et al. .................... 361/18
5,333,105 A   7/1994 Fortune ....................... 363/56.11
(Continued)

FOREIGN PATENT DOCUMENTS

DE        19845281      4/2000    ............... H02H 9/04
DE     102004036 164   3/2006    ............... H02H 3/20
(Continued)

OTHER PUBLICATIONS

Notification Concerning Transmittal of International Preliminary Report on Patentability (Chapter I of the Patent Cooperation Treaty), in English, dated May 5, 2011, International Preliminary Report on Patentability (Chapter I of the Patent Cooperation Treaty), in English, dated Apr. 26, 2011, and International Seach Report, in English, dated Mar. 3, 2010.

*Primary Examiner* — Danny Nguyen
(74) *Attorney, Agent, or Firm* — Gerald T. Bodner (57) ABSTRACT

The invention relates to a multi-staged overvoltage protection circuit, in particular for information-technology systems, comprising at least one coarse protection element and at least one fine protection element, wherein the at least one fine protection element can be activated by a triggering device depending on a threshold. According to the invention, the applied operating voltage is led to an evaluation device, which generates a reference voltage. Also provided is an evaluation unit, firstly for checking to see whether the current operating voltage is above the reference voltage, secondly for checking to see whether the voltage excess exceeds a previously determined level, and thirdly for establishing whether the rate of change of the operating voltage is greater than another previously determined value so that a transient overvoltage exists, wherein the triggering device then receives an activation signal from the evaluation device.

20 Claims, 9 Drawing Sheets

(56) References Cited

U.S. PATENT DOCUMENTS

| | | | |
|---|---|---|---|
| 5,532,897 A * | 7/1996 | Carpenter, Jr. | 361/118 |
| 5,940,259 A | 8/1999 | Robinson | 361/56 |
| 6,727,555 B2 | 4/2004 | Heinisch et al. | 257/355 |
| 7,102,862 B1 | 9/2006 | Lien et al. | 361/56 |
| 2003/0112572 A1 | 6/2003 | Knigge et al. | 361/113 |
| 2003/0202302 A1 * | 10/2003 | Manning et al. | 361/88 |
| 2005/0180080 A1 | 8/2005 | Harris | 361/111 |
| 2006/0176626 A1 | 8/2006 | Griesbach et al. | 361/56 |

FOREIGN PATENT DOCUMENTS

| | | | |
|---|---|---|---|
| EP | 0827316 | 3/1998 | H04M 1/74 |
| EP | 1278283 | 1/2003 | H02H 9/04 |
| WO | WO02/50973 | 6/2002 | H02H 9/04 |
| WO | WO2004/006408 | 1/2004 | H02H 9/04 |

* cited by examiner

PRIOR ART

MULTI-STAGE OVERVOLTAGE PROTECTION CIRCUIT, IN PARTICULAR FOR INFORMATION-TECHNOLOGY SYSTEMS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates to a multi-stage overvoltage protection circuit, in particular for information technology systems, comprising at least one coarse-protection element and at least one fine-protection element, wherein the at least one fine-protection element can be activated by a triggering device depending on a threshold.

(2) Description of the Related Art

Overvoltage protection circuits consisting of multiple stages are described in the known prior art. Usually, a first stage is formed by a component capable of arresting high currents whilst having a comparatively high operating voltage. Such a component may be a gas discharge arrester. Although such a protection circuit can be used in a great nominal value range, it does not provide sufficient protection for information technology equipment such as computers, telephone systems or the like due to the high protection level. Therefore, there is usually provided an additional stage, in which a fine-protection element, namely a Z-diode, a TVS-diode or the like is provided, which is rated for the signal voltage so that a limitation as near as possible to the nominal voltage is guaranteed. At least one decoupling element is provided between the coarse-protection element and the fine-protection element, which serves to coordinate the behavior of the aforementioned stages.

An amplifier circuit comprising an overvoltage protection device is disclosed in DE 198 45 281 A1. The fine-protection element is a transistor short-circuiting the provided amplifier signal wires if a fixed threshold is exceeded. Specifically, a transistor protection circuit is connected downstream of the actual overvoltage arrester in the overvoltage interference signal direction, whose transistors are blocked during normal operation and are switched when an overvoltage occurs, by limiting the maximum acceptable voltage.

In the voltage-limiting device according to DE 10 2004 036 164 A1 at least one voltage input and one voltage output are provided. A first voltage-limiting unit is provided with at least one input and one output such that at least a first switch is provided in the first voltage-limiting unit between the input and the output. In addition, a voltage sensor is provided in the first voltage-limiting unit, which is configured to open the first switch when a voltage is present at the input of the first voltage-limiting unit that is greater than a predeterminable maximum voltage value.

EP 1 278 283 A2 describes a device for the protection of electronic components against overvoltages, comprising at least one transistor which is switchable by a trigger circuit upon reaching predetermined overvoltage values, thereby converting disturbing electrical energy to thermal energy. The fine-protection element used is a Z-diode.

PCT/WO 2004/006408 A1 discloses a protection circuit having an electronic decoupling element TBU which goes into a high-impedance state if a current value is exceeded, thereby limiting the flow of current to a terminal. The disadvantage of this teaching is that a voltage-limiting component has to be provided in the terminal in order to generate a sufficiently high flow of current in the event of an overvoltage.

In the protection unit for a modem according to PCT/WO 02/50973 A1 a fine-protection element is switched in by a thryristor. The thyristor is driven by the current flow to a terminal. The disadvantage of this circuit configuration is that this terminal, too, has to include a voltage-limiting component in order to generate a sufficient flow of current in the event of an overvoltage.

OBJECTS AND SUMMARY OF THE INVENTION

Based on the solutions according to the prior art it is the object of the invention to provide a further developed multi-stage overvoltage protection circuit, in particular for information technology systems, which can be used for a greatest possible voltage range and with the aid of which an overvoltage limitation as near as possible to the operating voltage can be accomplished.

The solution to the object of the invention is achieved with the combination of the features according to the teaching of patent claim 1. The dependent claims define at least useful embodiments and advancements.

The multi-stage overvoltage protection circuit according to the invention is capable of automatically adjusting itself to present operating voltages. If the value of the detected operating voltage is intolerably exceeded by an overvoltage, the voltage level is limited and the resulting disturbance current is arrested.

In contrast to known overvoltage protection circuits it is not necessary to set up a specific type of overvoltage protection device for each operating voltage level.

According to the invention the present operating voltage is passed to an analyzer which generates a reference voltage.

In addition, an evaluation unit is provided, firstly for checking whether the current operating voltage exceeds the reference voltage. Secondly, it is checked whether the value exceedance exceeds a predetermined level in order to find out, in the third place, whether the rate of change of the operating voltage is greater than another predetermined value. Should this be the case, a transient overvoltage is concluded and the triggering device receives an activation signal from the analyzer.

In the event of a value exceedance of the predetermined level of the operating voltage, which is associated with low rates of change, the analyzer provides a new, current reference voltage which is adapted to the current operating conditions.

In one embodiment of the invention the operating voltage in the analyzer is passed via a diode D2 to a capacitor C1, which capacitor C1 is connected to an operating voltage potential via a resistor R3 connected in series. The voltage present at capacitor C1 is the reference voltage.

The time constant for the rate of change of the operating voltage is defined by the resistor R3 and the capacitor C1, wherein an evaluable voltage is present at R3 if the time constant is exceeded.

At the connection point between the capacitor C1 and the resistor R3 a Zener diode D3 is provided, which defines the additional range of the change of the operating voltage.

At the output end of the Zener diode D3 another capacitor C2 is provided, which is connected towards the operating voltage potential, in order to limit the slew rate of the trigger voltage of the fine-protection element.

The fine-protection element is triggered by a transistor the base of which is connected to the aforementioned capacitor C2.

Another Zener diode D4 for adjusting the maximum limit voltage is connected between the operating voltage potential and the base of the transistor.

Moreover, a decoupling element in the form of a resistor, an inductance, a capacity and/or a TBU unit is provided between the protection stages in a manner known per se.

The invention shall be explained in more detail below by means of an embodiment and with the aid of figures:

DETAILED DESCRIPTION OF THE PREFERRED EMBODIMENTS

Figure 1:
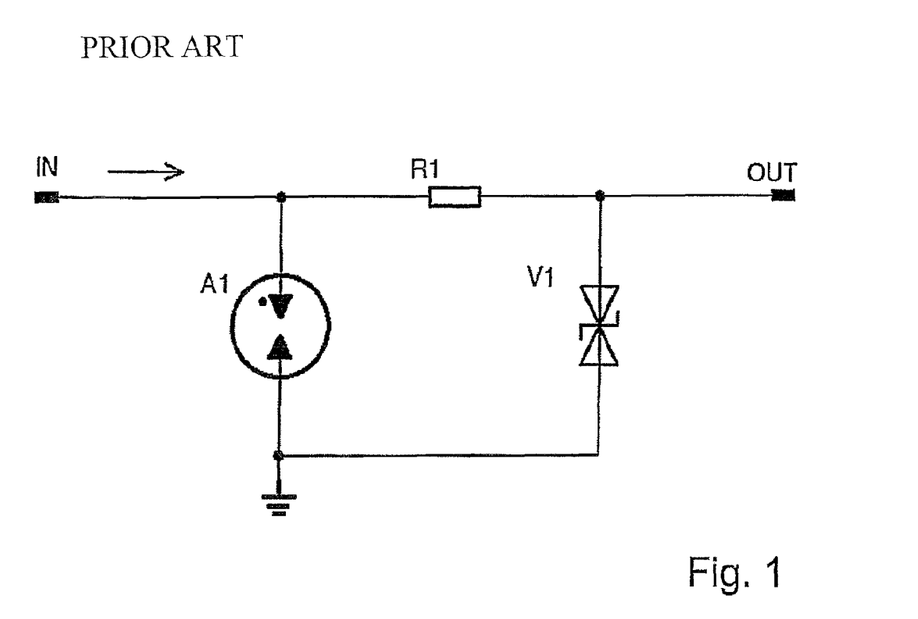
FIG. 1 shows a known overvoltage protection circuit according to the prior art, comprised of two stages A1 and V1, with a decoupling resistor R1 being connected between the input IN and the output OUT.
Figure 2:
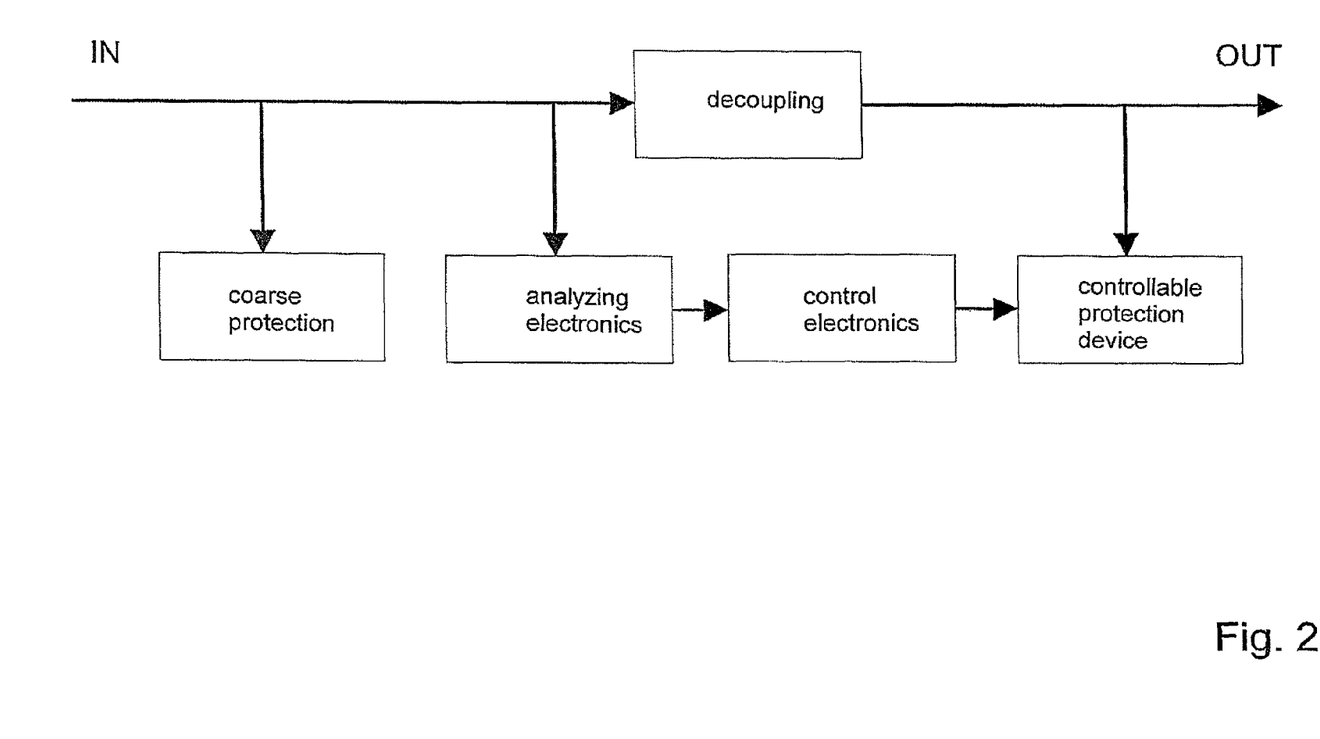
FIG. 2 shows a block diagram of the device according to the invention.

As is shown in the block diagram of FIG. 2 the overvoltage protection circuit comprises a coarse-protection element and a controllable fine-protection device between input IN and output OUT. Both aforementioned assemblies are separated from each other by a decoupling unit.

In addition, an analyzing electronics is provided, which is connected to a control electronics which, again, acts on the controllable protection device at the output end. As can be seen in FIG. 2, the present operating voltage is supplied to the analyzing electronics, and this electronic device continuously monitors the operating voltage.

If the present voltage increases a decision is made in consideration of predefined criteria whether the voltage increase is an unacceptable overvoltage. In the event of an overvoltage the (fine) protection device is activated by a control electronics or triggering device, respectively.

Depending on the capacity of the controllable (fine) protection device a coarse protection may be connected upstream thereof.

The analyzing electronics has the function to distinguish between a voltage change in the form of an overvoltage or an additional change of the operating voltage.

Figure 3:
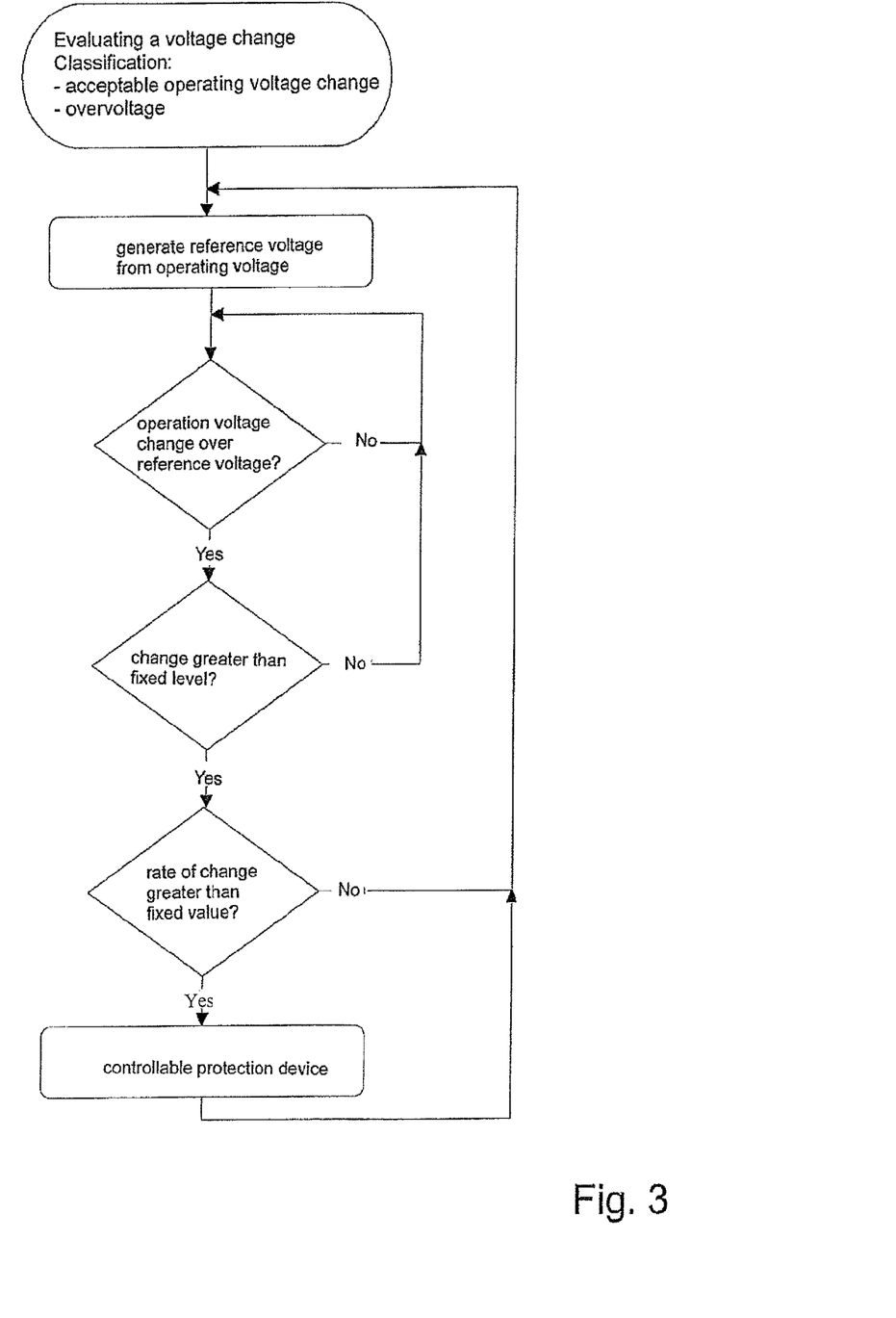
FIG. 3 shows a program flow chart with respect to the evaluation of a voltage change by the analyzer.

The evaluation of the voltage changes by the analyzing electronics is shown in the flow depicted in FIG. 3.

Initially, a reference voltage is generated from the supplied operating voltage, which is used for adjusting the nominal voltage and limit voltage for the overvoltage protection circuit.

If the current operating voltage varies relative to the reference voltage a decision is made whether an acceptable change of the operating voltage or an overvoltage is present.

Figure 4:
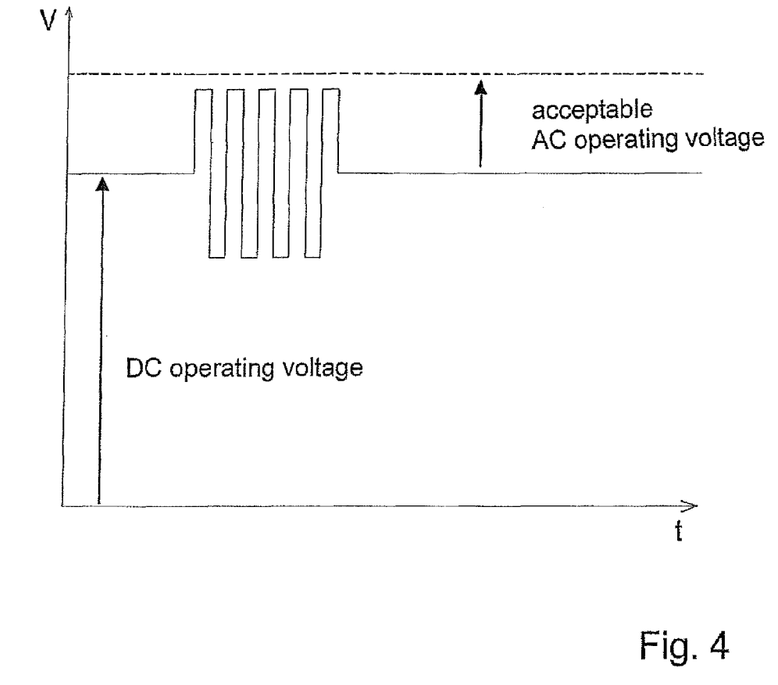
FIG. 4 shows the voltage-time behavior in the event of a change in an acceptable range near the reference voltage, e.g. a signal voltage superimposed on a supply voltage, without limiting this system-induced change of the operating voltage.
Figure 5:
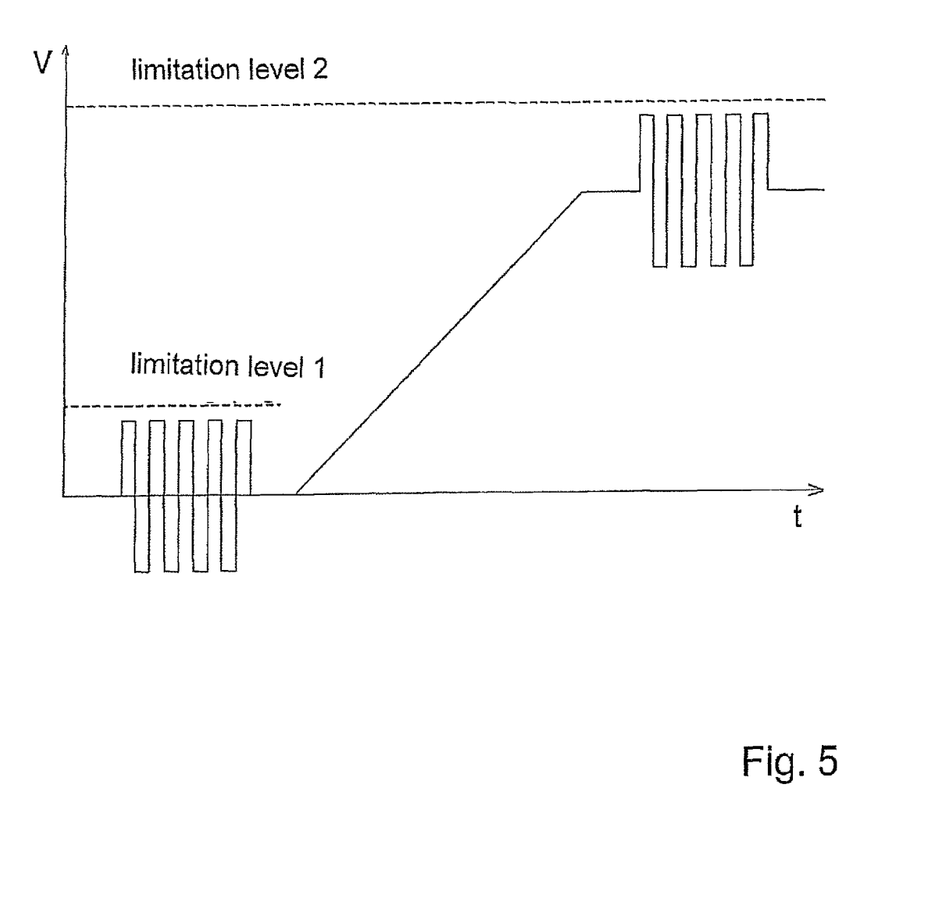
FIG. 5 shows a voltage-time behavior in the case where the acceptable range near the reference voltage is exceeded, while the slew rate of the voltage change does not yet exceed a fixed value, so that the change is likewise an acceptable change, with the consequence that the voltage level is not limited, but a new reference voltage is generated.
Figure 6:
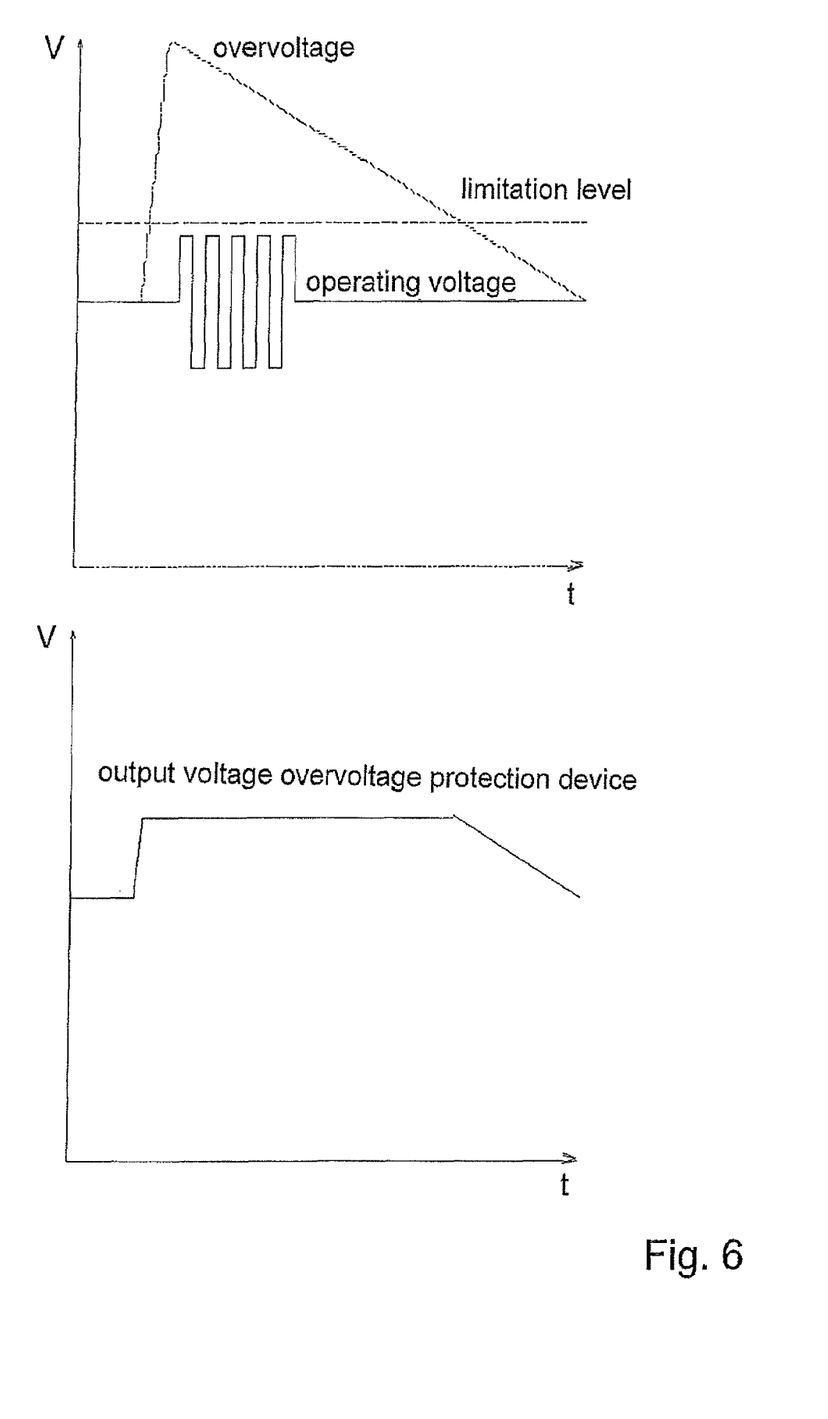
FIG. 6 shows voltage-time behaviors in which the acceptable range near the reference voltage is exceeded, the slew rate of the voltage change likewise exceeds a fixed value, the overvoltage being a transient one, with the consequence that a limitation of the present voltage is initiated.

For the decision the following criteria are evaluated:
a) If the change is within an acceptable range near the reference voltage a signal voltage is concerned which is superimposed on a supply voltage. In this case, this system-induced change of the operating voltage will not be limited. A corresponding behavior is shown in FIG. 4.
b) In case the acceptable range of the reference voltage is exceeded, while the slew rate of the voltage change does not exceed a fixed value, however, an unacceptable change of the operating voltage is detected. However, in this case, too, the voltage level is not yet limited. Rather, a new reference voltage is generated, thereby fixing a new nominal voltage and limit voltage for the overvoltage protection circuit. This behavior is shown in FIG. 5.
c) If the acceptable range near the reference voltage is exceeded, and if the slew rate of the voltage change exceeds a fixed value, the overvoltage is a transient one. In this case, a limitation of the voltage is initiated, namely as shown in FIG. 6.

Figure 7:
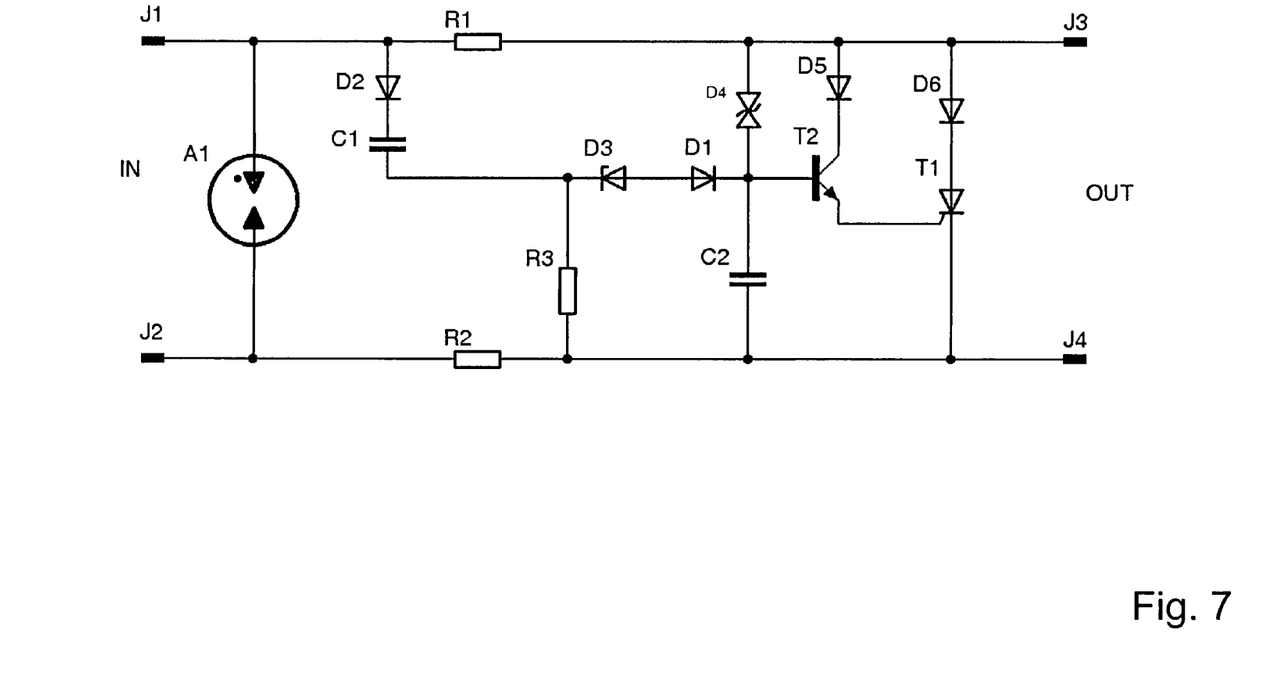
FIG. 7 shows a first example of a circuit of the embodiment of the overvoltage protection circuit.

FIG. 7 shows a first embodiment of a practically realized overvoltage protection circuit for limiting positive voltage impulses for signals in information technology systems.

A thyristor T1 is used as fine-protection element, which is triggered by a transistor T2.

By means of the transistor T2 the control current for the thyristor T1 is reduced by the factor of the current amplification in order to reduce the load on the signal circuit.

The voltage at the capacitor C1 is proportional to the DC component of the signal voltage. The time constant defined by resistor R3 and capacitor C1 determines the adjustment rate of this reference voltage.

If the slew rate of the present signal exceeds this time constant a voltage at resistor R3 decreases.

The acceptable range for the change of the operating voltage is defined by the selection of the Zener voltage of the Zener diode D3. In the circuit shown, which includes diode D1 and transistor T2, this value is obtained by $U_z+2.3$ V. If the voltage at resistor R3 exceeds this value, thyristor T1 is triggered.

The slew rate of the trigger voltage for thyristor T1 is limited by means of capacitor C2. If the signal voltages have high slew rates (square-wave signals) this is advantageous in order to avoid an undesired activation.

The Zener diode D4 defines the maximum limit voltage of the introduced circuit.

Figure 8:
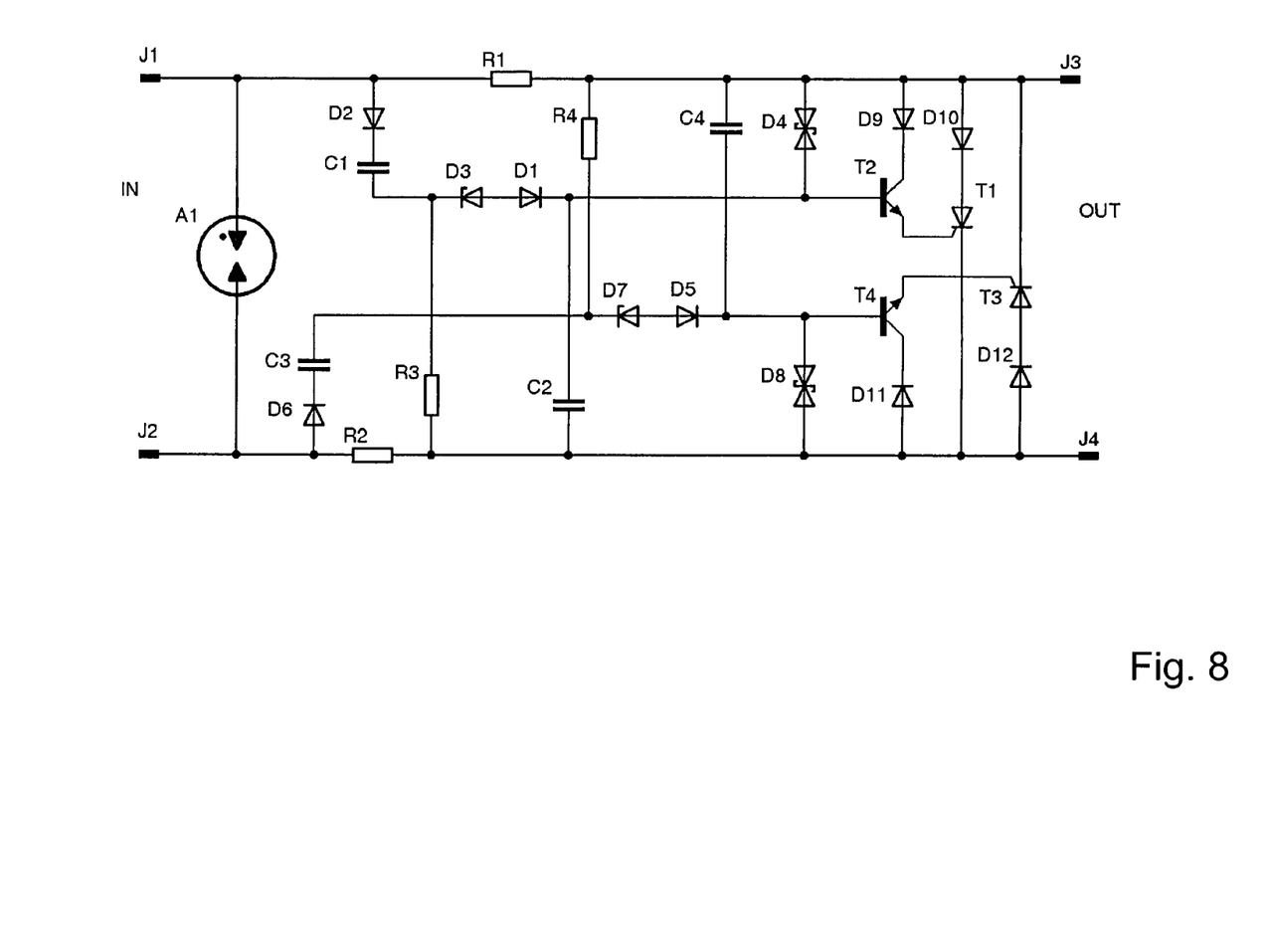
FIG. 8 shows a second embodiment of the overvoltage protection circuit with a bipolar circuit configuration for limiting positive and negative operating voltages.

FIG. 8 shows another embodiment of the invention, which is based on the explanations of the circuit according to FIG. 7, but which is bipolar so as to allow a limitation of positive and negative operating voltages.

The circuit configuration for bipolar operating voltages as shown in FIG. 8 comprises two thyristors T1, T3 for the respective polarity. Alternatively, a triac could be used as well.

In the example shown in FIG. 8 the analyzing electronics is configured to be redundant. Thus, the reference voltage for positive direct voltage components is generated by C1. If the DC voltages are negative, the reference voltage is generated by C3. An additional advantage of this embodiment is that the connections of the overvoltage protection circuit may be confused, meaning that a reverse polarity protection is obtained and errors during the installation are precluded.

In the example according to FIG. 8 the thyristors are triggered separately depending on the respective polarity of the provided thyristor. The use of a triac or of thyristors with two gates, which are triggerable on the anode side and the cathode side, also allows an embodiment with a separate analyzing electronics and control.

Figure 9:
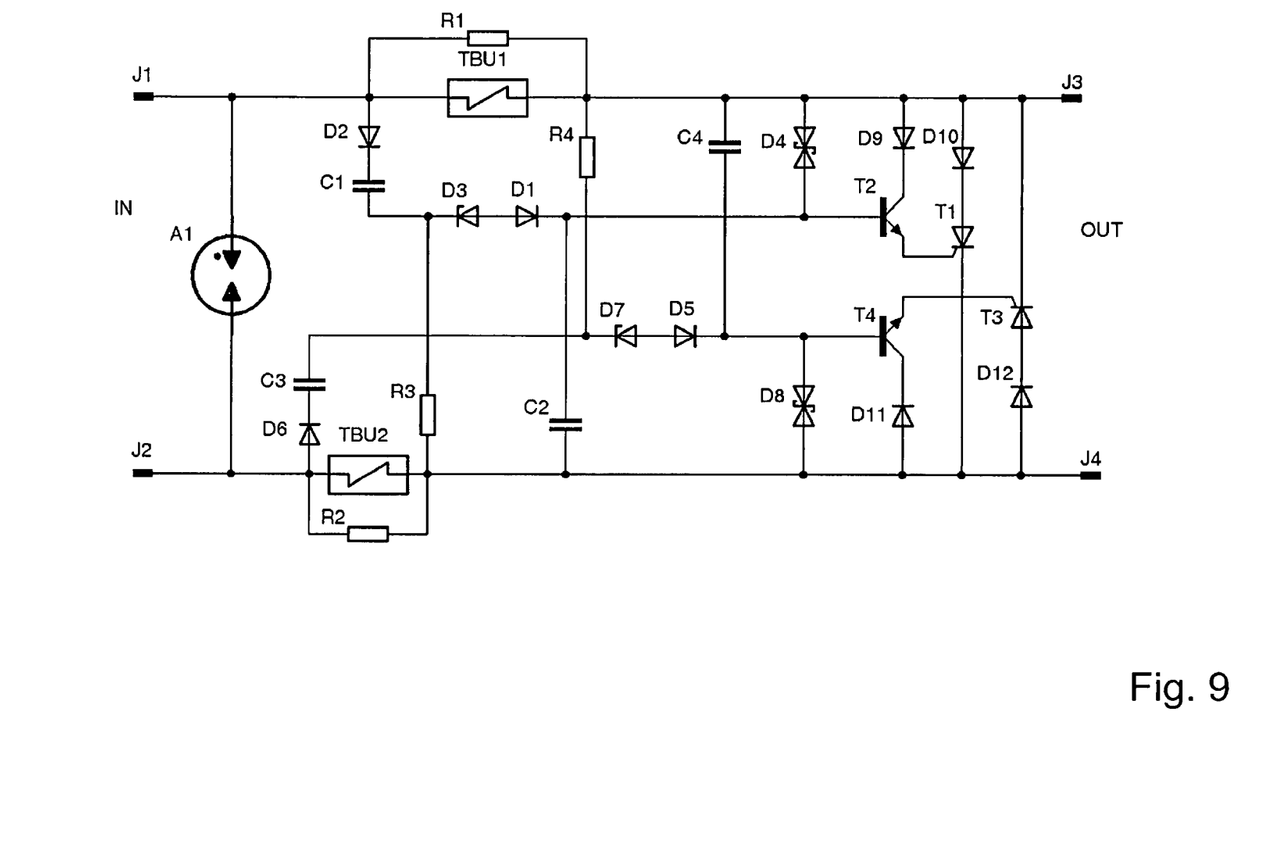
FIG. 9 shows a third embodiment of an overvoltage protection circuit with electronic decoupling elements (TBU).

In the embodiment of the circuit configuration according to FIG. 9 the advantages of electronic decoupling elements (TBU) are combined with the introduced inventive solution of a triggerable fine-protection element in a bipolar configuration.

With respect to the function of the analyzing electronics and control of the thyristors the circuit configuration shown in FIG. 9 largely corresponds to the example according to FIG. 8. A difference is the use of a TBU (Transient Blocking Unit) instead of a conventional resistor or an inductance as decoupling element.

The function of the TBU can be compared with that of an electronic switch. The TBU monitors the current flow between its input and output. If the current exceeds a fixed value, the TBU is activated and very quickly switches off the connection in-output. This function allows the realization of an ideal decoupling element by means of which a very small current load on the fine protection and, along with that, a very low protection level for the overvoltage protection circuit can be obtained.

TBU components have the disadvantage that the resetting from the triggered state, i.e. the high-impedance state, to the original state, the low-impedance state, the voltage at the TBU has to be lower than an assigned value, in the specific case 14V. However, during the operation with a direct voltage >14V this cannot be guaranteed without additional measures. Due to the parallel connection of a resistor relative to the TBU the invention provides for a simple possibility to achieve this with a predefined maximum operating voltage.

With respect to the example shown this resistance can be determined as follows:

Maximum operating current: 100 mA
Voltage at TBU: ≤10V $$R = \frac{10\ V}{0.1\ A} = 100\ \Omega$$

Of course, also a combination in the form of a series or parallel connection of TBU and resistor as coupling element is possible.

In order for the TBU, after its activation, to return to its initial low-impedance state after the interference has faded, it has been ensured that the voltage drop at the TBU falls below an assigned value. By suitably dimensioning the combination TBU and resistor a necessary resetting may be ensured.

The introduced solution provides for an overvoltage protection circuit which automatically adapts itself to the respective operating voltage, whereby an analyzing electronics ensures an activation of the protection device if a relevant overvoltage is detected.

The value for the limit voltage is continuously adapted to the operating voltage so that an optimum voltage limitation is obtained for the respective current operating voltage value if an overvoltage occurs.

The analyzing electronics is capable of carrying out an evaluation on the basis of a signal analysis (rate of change, voltage swing, maximum level) of the operating voltage in order to clearly determine whether an acceptable operating voltage or an overvoltage is present. The control circuit for the direct voltage component of the operating voltage can be realized with a low capacitance, and a bipolar configuration of the circuit for positive and negative signals and operating voltages is possible.

The limitation of the operating voltage can be adjusted to a fixed upper limit value by an additional Z-diode wherein, in this case, the voltage-limiting circuit can be activated directly, by bypassing the analyzing electronics. Due to the series connection of a diode and a thyristor, as provided in the embodiments, it is possible to reduce the reverse current and the capacity of the entire circuit configuration.

Additionally, it is pointed out that rates of change occurring when the operating voltage is switched on or when operating conditions change, are, according to the invention, not meant to result in a reaction of the overvoltage protection circuit, for example, if an operating voltage of 24 V DC is switched on. This switch-on process can be assumed to take a typical time of 1 ms. This would result in a rate of change of 24V/ms.

Contrary to this, overvoltage impulses caused by the effect of lightning or switching activities have a substantially higher slew rate. For example, in the directives for telecommunication systems the lowest influence to be assumed is specified with a pulse shape 10/700 µs and an amplitude of 1 kV. This results in a rate of change of 100V/µs.

What is claimed is:

1. A multi-stage overvoltage protection circuit, in particular for information technology systems, comprising at least one coarse-protection element and at least one fine-protection element, wherein the at least one fine-protection element can be activated by a triggering device depending on a threshold, characterized in that the present operating voltage is passed to an analyzer which generates a reference voltage from the present operating voltage, that further an evaluation unit is provided, firstly for checking whether the current operating voltage exceeds the reference voltage, secondly for checking whether the value exceedance exceeds a predetermined level in order to find out, in the third place, whether a rate of change of the operating voltage is greater than another predetermined value so that there is a transient overvoltage, wherein the triggering device receives an activation signal from the analyzer when the value exceedance exceeds the predetermined level and the rate of change of the operating voltage is greater than the another predetermined value.

2. The overvoltage protection circuit according to claim 1, characterized in that in the event of a value exceedance of the predetermined level of the operating voltage, which is associated with low rates of change, the analyzer provides a new, current reference voltage which is adapted to the current operating conditions.

3. The overvoltage protection circuit according to claim 1, characterized in that
the operating voltage in the analyzer is passed via a diode (D2) to a capacitor (C1), which capacitor (C1) is connected to an operating voltage potential via a resistor (R3) connected in series, with the voltage present at capacitor (C1) being the reference voltage.

4. The overvoltage protection circuit according to claim 3, characterized in that
the time constant defined by the resistor (R3) and the capacitor (C1) defines the rate of change of the operating voltage, wherein a voltage is present at resistor (R3) if the time constant is exceeded.

5. The overvoltage protection circuit according to claim 4, characterized in that
at the connection point between the capacitor (C1) and the resistor (R3) a Zener diode (D3) is provided, which defines the acceptable range of the change of the operating voltage.

6. The overvoltage protection circuit according to claim 5, characterized in that
at the output end of the Zener diode (D3) another capacitor (C2) is provided, which is connected towards the operating voltage potential, in order to limit the slew rate of the trigger voltage of the fine-protection element.

7. The overvoltage protection circuit according to claim 6, characterized in that
the fine-protection element (T1) is triggered by a transistor (T2) the base of which is connected to the capacitor (C2).

8. The overvoltage protection circuit according to claim 7, characterized in that
another Zener diode (D4) for adjusting the maximum limit voltage is connected between the operating voltage potential and the base of the transistor (T2).

9. The overvoltage protection circuit according to claim 1, characterized in that
a decoupling element in the form of a resistor, an inductance, a capacity and/or a TBU unit is connected between the protections stages.

10. The overvoltage protection circuit according to claim 2, characterized in that
the operating voltage in the analyzer is passed via a diode (D2) to a capacitor (C1), which capacitor (C1) is connected to an operating voltage potential via a resistor (R3) connected in series, with the voltage present at capacitor (C1) being the reference voltage.

11. The overvoltage protection circuit according to claim 10, characterized in that
the time constant defined by the resistor (R3) and the capacitor (C1) defines the rate of change of the operating voltage, wherein a voltage is present at resistor (R3) if the time constant is exceeded.

12. The overvoltage protection circuit according to claim 11, characterized in that
at the connection point between the capacitor (C1) and the resistor (R3) a Zener diode (D3) is provided, which defines the acceptable range of the change of the operating voltage.

13. The overvoltage protection circuit according to claim 12, characterized in that
at the output end of the Zener diode (D3) another capacitor (C2) is provided, which is connected towards the operating voltage potential, in order to limit the slew rate of the trigger voltage of the fine-protection element.

14. The overvoltage protection circuit according to claim 2, characterized in that
a decoupling element in the form of a resistor, an inductance, a capacity and/or a TBU unit is connected between the protections stages.

15. The overvoltage protection circuit according to claim 3, characterized in that
a decoupling element in the form of a resistor, an inductance, a capacity and/or a TBU unit is connected between the protections stages.

16. The overvoltage protection circuit according to claim 4, characterized in that
a decoupling element in the form of a resistor, an inductance, a capacity and/or a TBU unit is connected between the protections stages.

17. The overvoltage protection circuit according to claim 5, characterized in that
a decoupling element in the form of a resistor, an inductance, a capacity and/or a TBU unit is connected between the protections stages.

18. The overvoltage protection circuit according to claim 6, characterized in that
a decoupling element in the form of a resistor, an inductance, a capacity and/or a TBU unit is connected between the protections stages.

19. The overvoltage protection circuit according to claim 7, characterized in that
a decoupling element in the form of a resistor, an inductance, a capacity and/or a TBU unit is connected between the protections stages.

20. The overvoltage protection circuit according to claim 8, characterized in that
a decoupling element in the form of a resistor, an inductance, a capacity and/or a TBU unit is connected between the protections stages.

* * * * *